Nov. 5, 1929.      E. J. BLOOM      1,734,361
GAS VENTING DEVICE
Filed April 11, 1928

INVENTOR
Edgar J. Bloom
BY
Richey & Watts
ATTORNEY

Patented Nov. 5, 1929

1,734,361

UNITED STATES PATENT OFFICE

EDGAR J. BLOOM, OF TIFFIN, OHIO

GAS-VENTING DEVICE

Application filed April 11, 1928. Serial No. 269,121.

This invention relates to a gas venting bung designed for use in connection with kegs, barrels, jugs and other containers holding liquids particularly those under fermentation, one of the objects of the invention being to provide a bung including a gravity operated check adapted to open automatically under pressure from within the container but to remain normally closed so as thereby to prevent admission of air through the bung.

Another object is to provide a structure of this character all parts of which can be formed of materials or a material which will not corrode and the parts of which can be readily separated and assembled.

A further object is to provide a simple and efficient valved bung which is cheap to manufacture, is formed of the minimum number of parts, and cannot get out of order through corrosion or any other cause.

A further object is to provide an automatic valve or check in connection with the bung which will maintain an unvarying resistance to the escape of gas.
Another object is to provide a bung which can be left in position whenever it is desired to withdraw a portion of the contents of the container for the purpose of testing, etc.

Another object is to provide an article of the class described which is adapted to permit free escape of gas from the interior of a vessel while protecting the valve portion from such contact with liquid in the vessel as would tend to interfere with the gas sealing action of the valve.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings one embodiment of the invention has been shown.

In the drawings:
Fig. 1 is an elevation of a bung embodying my invention, a portion of the vessel in which it is seated being shown in section;

Figure 1:
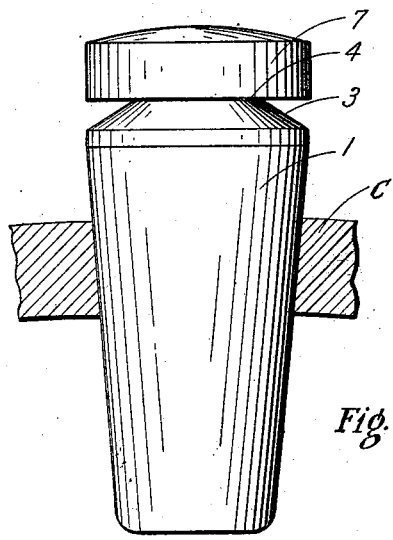
Figure 2:
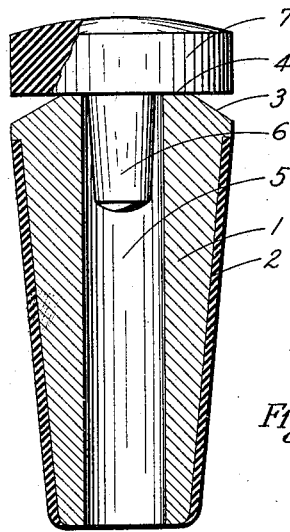
Fig. 2 is a section through the bung of Fig. 1, the check or valve being shown partly in elevation and partly in section.
Figure 3:
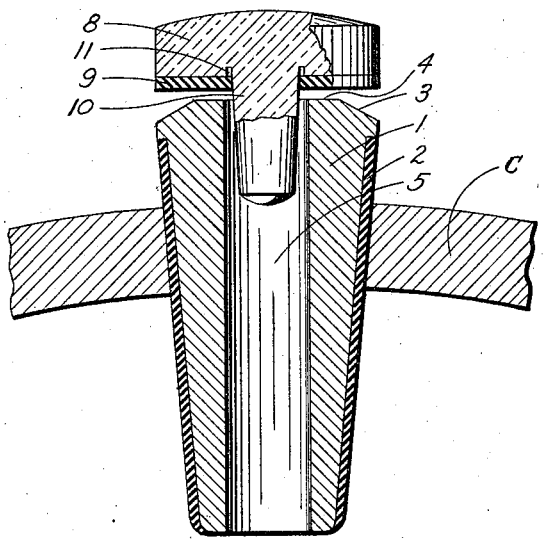
Fig. 3 is a view similar to Fig. 2 showing a slightly modified structure.

Referring to the figures by characters of reference, 1 designates a bung which can be formed of wood, cork, rubber or other suitable material. This bung is tapered toward one end as ordinarily and, for the purpose of effecting a tight seal, can be provided with a jacket 2 of rubber. The outer or large end of the bung may be provided with an abrupt taper or bevel 3 extending to a flat or plane seat 4 at the end of the bung and which seat extends around one end of a bore 5 formed longitudinally through the bung. This bore may be sufficiently large to receive a rubber tube or the like should it be desired to withdraw the liquid contents of the container C in which the bung is seated. Ordinarily, however, the bore 5 receives loosely a stem 6 which projects from the head 7 of the check or valve of the bung, this head, in the structure shown in Fig. 2, being formed of rubber and having sufficient weight so that the head is normally seated by gravity upon the seat 4 so as to prevent the admission of outside air to the container. The stem 6 can be formed of rubber or, if preferred, and as shown in Fig. 3, the stem and the head can be formed of other materials such as glass, porcelain, wood or the like. Should the head be formed of a non-yielding material, as shown at 8 in Fig. 3, a washer or gasket 9 of rubber or other suitable yielding material is preferably placed against the inner surface around the stem 10. Thus the valve or check has the same sealing action as though made entirely of a yielding material as in Fig. 2. I prefer to form an annular recess 11 in the head about the stem 10 so that the washer 9 will fit about the stem without distortion and seat over substantially all of surface 4. This recess 11 insures such seating without requiring additional manufacturing costs.

The stems 6 or 10 are, by preference, substantially cylindrical and of such diameter as to fit in the bore 5 with a small clearance through which gas may pass when the head 7 or 8 is raised from its seat on the bung 1. These stems are much shorter than the bung 1, as shown, and may be even shorter than as shown since their chief function is to guide the head in its movement relative to the bung under the influence of gas pressure and gravity.

In using a device embodying my invention the top surface of the liquid D in container C (see Fig. 3) is maintained some distance, for example, an inch or more below the lower end of the plug 1 so that gases which bubble up through the liquid will not splash liquid into the bore 5 and so that in no case is liquid brought into contact with the stem 6 or 10, or washer 9 or head 7. Any liquid which does strike against the stem can drip off again. There is thus no possibility of gummy material being deposited between the gas sealing surfaces of the head and bung, nor of similar materials or other solids such as sugar adhering to the stem and interfering with the efficient functioning of the apparatus.

Since there is direct contact of the rubber head or washer of rubber or similar suitable material with the bung which is firmly fixed in the container C, a leak proof gas seal is insured at all times. The radial width of the washer 9 and of the end surface 4 of the bung is sufficient to afford ample sealing contact areas and incidentally to prevent distortion of the washer out of its initial flat condition.

Figure 4:
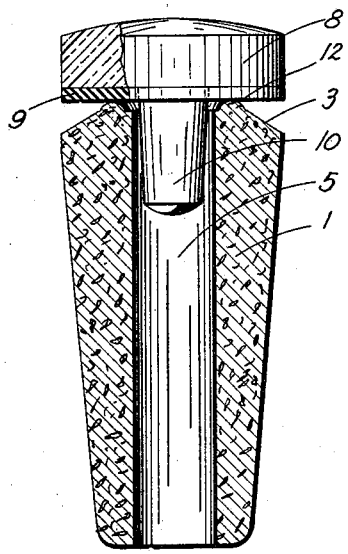
Fig. 4 shows a device similar to that of Figs. 1 to 3, but with a modified seating area on the bung for the valve head.

The modified seating arrangement shown in Fig. 4 comprises a curved surface 12 formed on the outer end of the bung about the bore 5. The valve head or washer will seat thereon as on the plane surface 4. If desired the head and/or washer may be similarly recessed to seat on the surface 12.

It will be apparent that as fermentation takes place in the container C the gas pressure will ultimately become sufficient to lift the check or valve from its seat, thereby relieving the pressure but at the same time preventing outside air from entering the container through the bung. As soon as the pressure has been relieved the check or valve will return by gravity to its seat and form a tight seal. No springs are required and no metal or other corrosive material is used. Consequently the objectionable results present where metal valves and the like are employed on bungs are eliminated. Furthermore the valves can readily be separated from the bung for the purpose of cleaning one or the other or for the purpose of inserting a tube when it is desired to remove a portion of the contents of the container. As the weight of the valve remains constant, it will be apparent that the valve will at no time open unless a predetermined pressure is generated within the container. In other words the valve will not open under different pressures as where a spring should be used which becomes less resilient through constant use due to corrosion and, consequently, less effective.

It will be understood that should the bung be made entirely of rubber it would not be necessary to provide the head or weight of the valve with a yielding surface. Instead the entire stem or valve could be made of non-yielding or non-corrosive material and could seat upon the rubber end of the bung and thereby effect a tight seal.

I claim:

An antifouling, gas venting device for containers for liquids comprising a bung adapted to extend into a container but to terminate above the surface of liquid in the container and having an opening therethru for the escape of gases and the removal of liquid from the container, and a removable, gravity actuated, gas sealing valve head seated on the upper end of the bung about the opening and having a guiding stem of substantially less length than the bung slidable in the opening whereby any liquid contacting with said bung will not reach said valve.

In testimony whereof I hereunto affix my signature this 29th day of March, 1928.

EDGAR J. BLOOM.